May 5, 1925.

A. H. PITNEY 1,536,925

CHANGEABLE DIE METER FOR POSTAGE METER MACHINES

Filed March 14, 1923   3 Sheets-Sheet 1

Inventor:
Arthur H. Pitney
By Alexander & Dowell
Attorneys.

Inventor:
Arthur H. Pitney
By Alexander Lmill
Attorneys.

Patented May 5, 1925.

1,536,925

UNITED STATES PATENT OFFICE.

ARTHUR H. PITNEY, OF STAMFORD, CONNECTICUT, ASSIGNOR, BY MESNE ASSIGN-MENTS, TO PITNEY-BOWES POSTAGE METER COMPANY, OF STAMFORD, CONNECTICUT, A CORPORATION OF DELAWARE.

CHANGEABLE DIE METER FOR POSTAGE-METER MACHINES.

Application filed March 14, 1923. Serial No. 624,997.

*To all whom it may concern:*

Be it known that I, ARTHUR H. PITNEY, a citizen of the United States, residing at Stamford, in the county of Fairfield and State of Connecticut, have invented certain new and useful Improvements in Changeable Die Meters for Postage-Meter Machines; and I hereby declare that the following is a full, clear, and exact description thereof, reference being had to the accompanying drawings which form part of this specification.

This invention relates to machines for impressing prepaid postage stamps or the like upon envelopes, cards, etc., and simultaneously registering the amount printed, and in particular is a novel changeable die meter adapted to be used on postage meter machines such as described in my Patent #1,370,668, for postage meter and mail marking machine, dated March 8. 1921.

Such machines are designed for use by persons, firms, or corporations having large numbers of letters to mail, and enables the user to purchase any desired amount of prepaid postage from the Post Office Department, and then print such postage from time to time, in any denomination desired, until the amount of postage paid for is exhausted, whereupon the meter and the machine will be automatically locked, so that no further stamps can be printed thereby.

The principal object of the present invention is to provide a portable changeable die postage meter adapted to be placed on and driven by the machine, as described in my aforesaid patent, the said meter however having a plurality of interchangeable dies, any one of which may be operatively positioned in the meter to imprint a stamp of corresponding denomination or value on the letter, and means being provided in such meter whereby the amount of the denomination of any stamp printed by any interchangeable die, operatively positioned in the meter, will be simultaneously automatically registered in the meter.

A subsidiary object of my invention is to provide a portable postage meter having a drive shaft on which is inseparably mounted a conical series of gears, so positioned and sized that when a die of a given denomination is operatively positioned in the meter a gear properly positioned and sized and fixedly attached to the die shaft will mesh with its related gear in the conical series of gears attached to the meter drive shaft, and, by reason of the proper ratios of such gears and of the train of gears, leading to the registering mechanism, an amount exactly according with the value or denomination of the stamp imprinted at each revolution of such die will be registered in the meter.

This invention increases the utility of the said patented machine (or other similar machine) to which the meter is attached by increasing the range of prepaid postage values or stamps usable by the owner of the machine without his having to increase the number of meters. It has heretofore been necessary in said patented machines to use a separate meter for each denomination of stamp, and as the meters are expensive, the owners usually provide only one or two denomination meters for the most frequently used denominations of stamps, and continue to carry a considerable assortment of adhesive stamps to be attached by hand to the heavier mail, and this mail, bearing such adhesive stamps, would be delayed at the post office for postmarking and cancellation of the stamps instead of being forwarded as expeditiously as the mail matter bearing the prepaid postage stamps made by the machine, as mail matter bearing the imprint and postmark of a postage meter machine goes direct to the distribution section of the post office for immediate despatch.

The greater part of the expense of construction of the postage meter used in my said patented machine is the registering devices and automatic locking and controlling devices therefor contained within the meter casing and inaccessible from the outside except by tearing down the meter; and one object of my invention is to make the printer or die of such a meter interchangeable, so that any one of a number of dies of different denominations can be used with the other mechanisms of the meter, thereby greatly enhancing the usefulness and efficiency of the meter with only a very slight proportionate increase in cost to the user, and doing away with the necessity for a separate meter for each denomination of stamp.

The invention in brief comprises a recording unit or meter and a plurality of interchangeable printing dies, each engraved to print indicia on mail matter, but each die being of a different denomination. Any one of these interchangeable dies may be mounted in the meter at the will of the operator, and when so mounted the meter will accurately record in terms of dollars and cents the value of each impression taken from each die. Each of the printing dies, when positioned in the machine, are so geared to the recording mechanism in the meter that the latter will be advanced at each imprint from a die an amount equal to the denomination engraved on the face of said die.

As stated, the novel meter with interchangeable dies is designed to be attached to the postage meter machine shown in my Patent #1,370,668, the operative connections between the meter and the machine being identical with those described in said patent and the new meter being interchangeable with the meter shown in said patent on said machine. This invention provides the users of the postage meter machines with means for printing indicia of several denominations with one meter.

The novel meter is further provided with means for automatically preventing operation of the machine unless the meter is in proper position therein; means for automatically stopping the effective operation of the machine when a predetermined amount of prepaid postage has been exhausted, as hereinafter explained, operating substantially as broadly covered in said patent, and also other safety locking means as hereinafter described, so that it would be impossible for the user of the machine to cheat the P. O. Department or for the owner or his employees to effectively operate the machine without a record of such operation being made by the registering mechanism.

The accompanying drawings illustrate one practical embodiment of the invention, and I will explain the same with reference thereto to enable others to adopt and use the same for various purposes, it being understood that the invention is capable of various changes in form, construction, and combinations of parts within the scope of the claims, which set forth the essentials of the invention, the novel features of construction, and novel combinations of parts, for all of which protection is desired.

As shown, the meter comprises a hollow base 301 which is closed by a slidable plate 304 immovably locked in closed position by a catch 305 actuated by a spring $305^s$, so that the plate 304 cannot be removed after it is once positioned, except for drilling through the plate. In the hollow base is contained a train of gearing for driving the registering mechanism from the die shaft hereinafter referred to. Rising from the base is an overhanging bracket $301^a$ in which the upper end of the drive shaft 308 is journaled, the lower end of said drive shaft being journaled in the base 301, as hereinafter referred to. Mounted upon the base to one side of the bracket $301^a$ is a housing 300 which contains the registering and counting mechanism hereinafter referred to. These parts, with the exception of the bracket $301^a$, are constructed substantially like the meter shown in my aforesaid patent, and the base 301 is machined on the bottom and sides to slide into planed ways on the postage meter machine, as described in said patent; such machine being provided with means for automatically tripping and driving the printing die. These means being described in detail in said patent need no further explanation herein.

Figure 1:
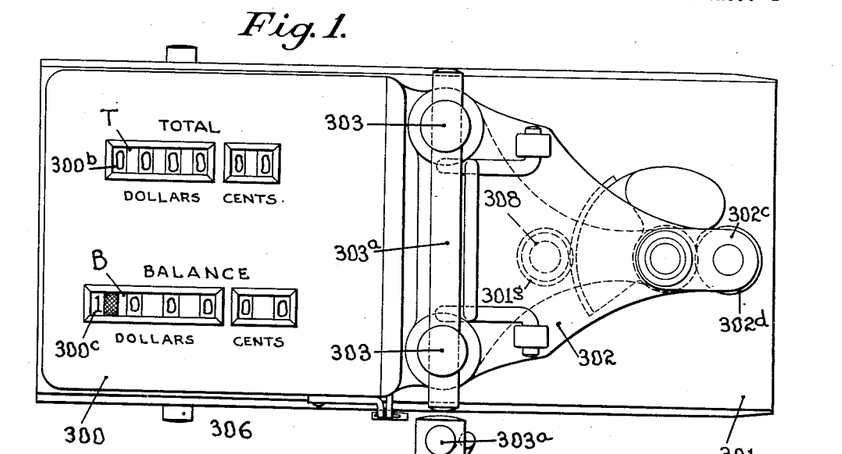
Figure 1 is a top plan view of a meter embodying the present invention.
Figure 2:
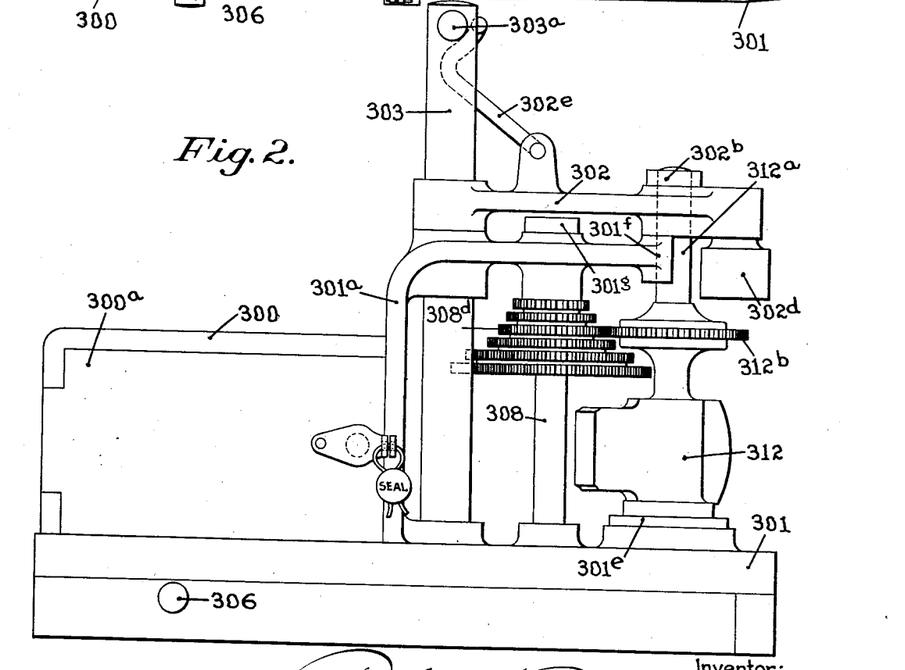
Fig. 2 is a side elevation of Fig. 1.
Figure 3:
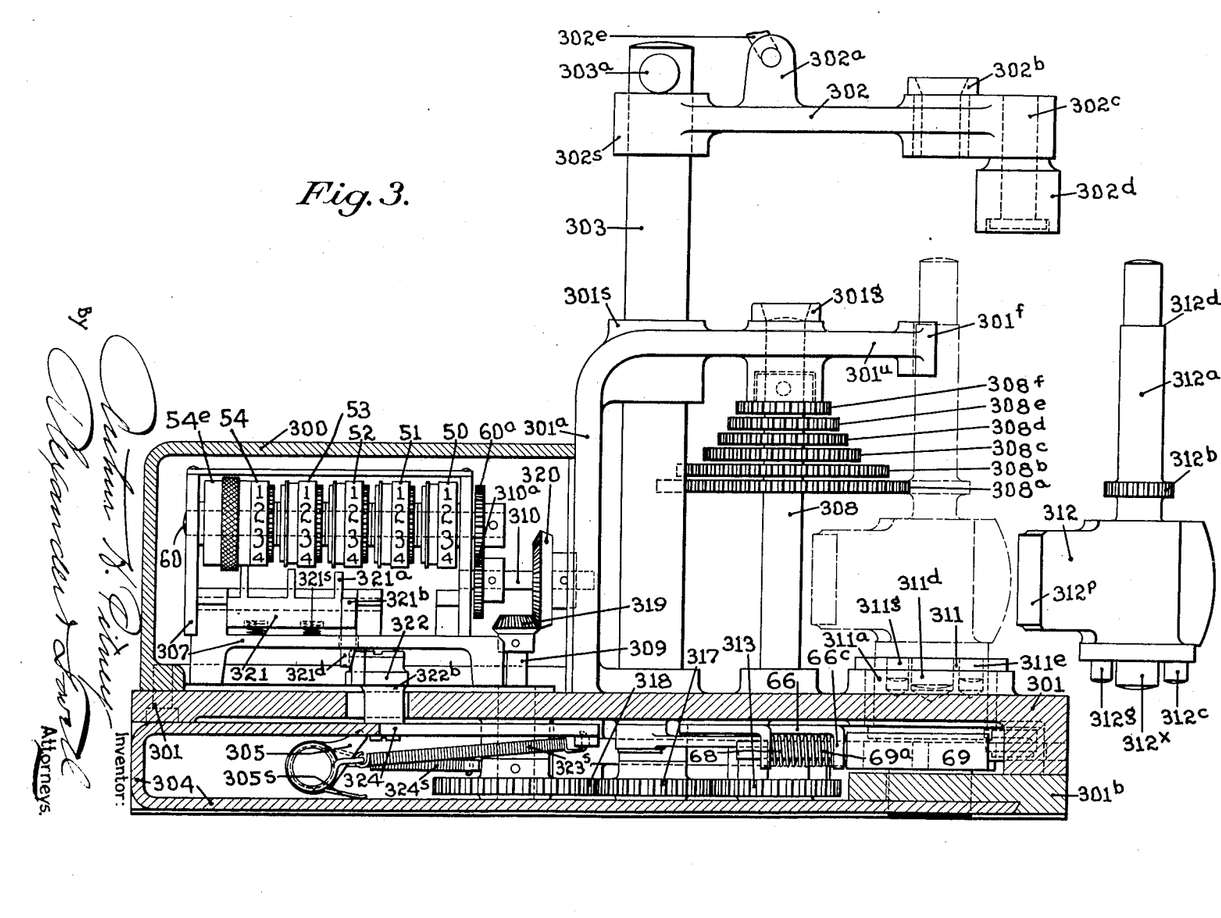
Fig. 3 is an enlarged part side elevation and part longitudinal vertical section through the meter.

A vertical drive shaft 308 has its lower end journaled in a bearing in the plate 301 (see Figs. 1 and 6) and its upper end journaled in a bearing $301^g$ in the bracket $301^a$, Figs. 1–3.

On this shaft 308 is fixed a conical set of gears $308^a$ to $308^f$ which are secured together as one piece and the whole unit is secured to the vertical shaft 308, as if integral therewith.

Figure 6:
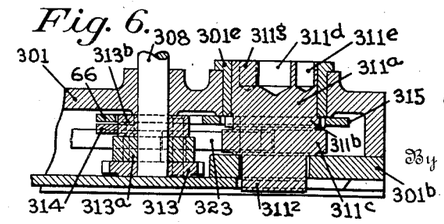
Fig. 6 is a detail vertical section through the die carrier operating and locking devices on approximately line 6—6 Fig. 5.

To the lower end of the shaft 308, Fig. 6, within the hollow base 301 is secured a spur gear 313, a ratchet $313^a$, and a cam $313^b$, all preferably securely fastened together and fixedly attached to the shaft 308. From the gear 313 motion is transmitted through intermediate gearing to the registering mechanism in the casing 300 as hereinafter explained. The uses of the ratchet $313^a$ and cam $313^b$ are also hereinafter explained.

Within the base 301, beside the shaft 308, is the die actuating member or carrier 311 (see Fig. 6) which is mounted to revolve in a bushing $301^e$ and a bearing in a plate $301^b$ of the base. The carrier 311 consists of an upper part $311^a$, a ratchet toothed part $311^b$, and a cam $311^c$, which parts may be made integral, or separately and rigidly united, to insure turning together as one piece. The lower end of this actuating member is provided with a tongue 311$^z$ which is adapted to engage the slot of a floating (Oldham) coupling located in the postage meter machine to drive the carrier 311 as desired. When the meter is properly positioned in the machine, said tongue 311$^z$ corresponds in location, size, and function with the similar tongue 47$^a$ of the meter shown and described in my aforesaid patent. In the upper part 311$^a$ (Figs. 3 and 6) are drilled three holes 311$^e$, 311$^d$ and 311$^g$, to receive pins 312$^c$, 312$^x$, and 312$^g$ respectively on the die 312.

Each of the dies 312 is preferably formed with a printing portion 312$^p$, which, when the die is in position in the machine, is adapted to coact with the impression member to make an impression upon a letter or article fed thereby, as described in my said patent, and end die 312 is provided with a shaft 312$^a$ by which the die is positioned and guided in its rotative movements, and a gear 312$^b$ on said shaft 312$^a$ adapted to engage its related gear of the set of conical gears 308—308$^f$ on the register driving shaft 308. The die has a pin 312$^x$ at its lower end in alignment with and practically forming a part of shaft 312$^a$ and pin 312$^x$ is adapted to seat in the hole 311$^d$ in the actuating member 311. Each die also has two pins 312$^c$ and 312$^g$ unsymmetrically placed with relation to the pin 312$^x$ of the die shaft 312$^a$ and adapted to engage with the holes 311$^e$, 311$^g$, respectively of carrier 311, to prevent the die from being placed in any other but the correct position relative to the actuating member 311. With the exception of the pins 312$^c$, 312$^x$ and 312$^g$, the die 312$^p$, shaft 312$^a$, and gear 312$^b$, are all preferably formed integral, or so made that they are absolutely inseparable as if formed integral.

The die is shown detached from the meter in full lines in Fig. 3, and in position in the meter in dotted lines in said figure. When positioned in the meter the die is properly centered on the actuating member 311 by the pins 312$^c$, 312$^g$, and 312$^x$, and the upper end of the die shaft is journaled in a bearing 302$^b$ attached to an adjustable plate 302 as hereinafter explained, the plate 302 being raised so as to clear the bearing 302$^b$ from the shaft 312$^a$, as shown in full lines in Fig. 3, when it is desired to insert or remove a die from the meter. In inserting the die in the meter the upper end of shaft 312$^a$ is engaged with a half bearing 301$^f$ on the top arm 301$^u$ of bracket 301$^a$ to steady the die shaft 312$^a$ and hold it in correct alignment while placing the die in the meter and meshing the die gear 312$^b$ with its related gear in the set of conical gears 308—308$^f$ on shaft 308.

Each of the dies 312 is provided with a gear 312$^b$, the diameter of such gear 312$^b$ and its position on the shaft 312$^a$ varying with the denomination of the indicia on its printing surface 312$^p$, the die of lowest denomination has the smallest sized gear and the die of highest denomination has the largest size gear 312$^b$. Each die 312, when properly mounted in the meter, will have its gear 312$^b$ meshed with its related gear in the set of cone gears 308$^a$—308$^f$. The die 312 makes one complete revolution at every printing operation, but the diameter of its gear 312$^b$ varies in direct ratio, and the diameter of its mating gear in the cone of gears 308$^a$—308$^f$ on shaft 308 varies in inverse ratio to the denomination of the stamp on the printing surface of such die. Consequently, the extent of angular movement imparted to the shaft 308 for each rotation of the die shaft 312$^a$ would be exactly proportional to the value of the denomination on the die printing surface 312$^p$, in use.

In the construction shown, the gear combination for the several dies 312 and the related gears 308$^a$—308$^f$ are selected in such manner that when a die for printing stamps of 1¢ value is mounted in the meter the shaft 308 will be advanced 90° or ¼ of a revolution for each operation of the die. If a die of 2¢ value is used, shaft 308 will be turned through 180° or one-half a revolution for each operation of such die. If a die of 10¢ value is used shaft 308 will be advanced 900 or 2½ revolutions for each revolution of the die. The other dies will cause shaft 308 to turn proportionally to their several values, or one-fourth revolution for each unit of value.

The numbers of the teeth in each of the cone gears 308$^a$—308$^f$ are multiples of 4, so that at the end of each operation, each of the gears 308$^a$—308$^f$ will come to rest with its teeth and tooth spaces relatively in the same position, so that there will be no difficulty in changing from one die to another, no matter which one of the four quarters of the shaft 308 may be opposite to, or in line with, the die 312.

To facilitate placing the dies in position in the meter and changing the dies when desired, any suitable means may be used for detachably holding the die in operative position in the meter. In the drawings the shaft 312$^a$ has a reduced journal on its upper end which is adapted to engage a bearing 302$^b$ in a bracket or plate 302, which is provided with short sleeves 302$^s$ slidably mounted on upright studs or posts 303 which pass through guides 301$^s$ in the bracket 301$^a$ and are secured at their lower ends to base 301 as shown in Figs. 1, 2 and 3. These uprights 303 extend considerably above the upper portion of the bracket 301$^a$ and serve as guides upon which the bearing plate 302 slides. A pin or rod 303ª may be fastened to and between the upper ends of the posts 303, and serves to limit the movement of the plate 302, and also as a handle by which to carry the meter. The bearing plate 302 is provided at one side of a bushing 302ᵇ with a depending stud 302ᶜ on which is mounted an idler feed roller 302ᵈ.

The idler roller 302ᵈ running on a stud 302ᵉ bears against the impression roller of the postage meter machine for the purpose of forwarding the mail matter after the printing is done and the die is at rest, and takes the place of the roller 39 shown in Fig. 6 of my aforesaid patent.

The bearing plate 302 can be firmly held in its "down" position by a bent wire catch 302ᵉ pivoted to plate 302 and adapted to be engaged with the cross pin 305ª as shown in Fig. 2.

In Fig. 2, a die 312 is shown in position in the meter, with its gears 312ᵇ properly in mesh with its related gear 308ᵈ secured to the vertical drive shaft 308. In this figure the bearing plate 302 is shown in its "down" position, its bushing 302ᵇ enclosing the upper end of the die shaft 312ª.

To place a die 312 in the meter the bearing plate 302 is raised to its "up" position (see Fig. 3), the die is then placed so that the bottom pin 312ˣ of the shaft 312ª enters the central hole 311ᵈ of the carrier 311, and the upper part of the die shaft 312ª rests in the half bearing 301ᶠ of the overhead bracket 301ᵘ. The die 312 is then turned until its bottom pins 312ᵉ, 312ᵍ, register with the holes 311ᵉ, 311ᵍ respectively, of the actuating member 311, whereupon the die 312 can be pushed down into place on the carrier 311. Its gear 312ᵇ will then properly engage the teeth of its related gear in the cone of gears 308ª—308ᶠ. The overhead bearing plate 302 is then lowered to position shown in Fig. 2, and the bushing 302ᵇ will engage and properly journal the top of die shaft 312ª. Then catch 302ᵉ is snapped under the cross pin 303ª as shown in Fig. 2. holding plate 302 in lowered position with the die operatively engaged with the actuating member 311 and the shaft 308. A shoulder 312ᵈ on shaft 312ª, engages under side of plate 302 and prevents the die 312 from raising up when the plate 302 is held down by catch 302ᵉ.

Figure 4:
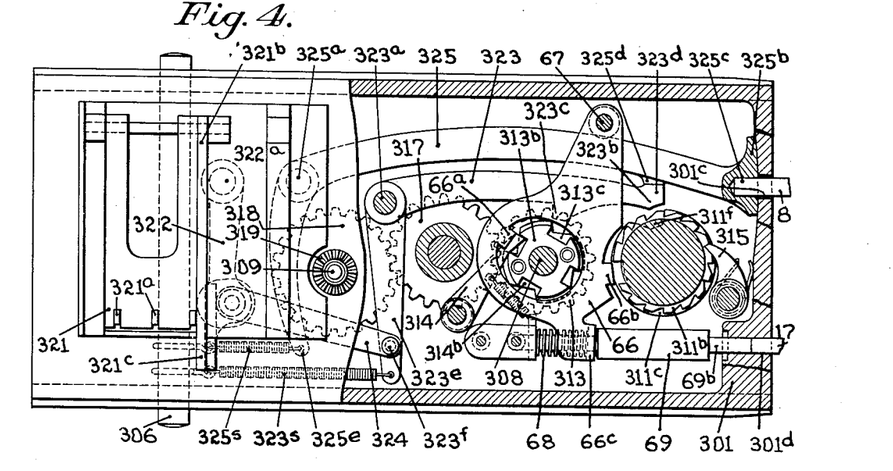
Fig. 4 is a horizontal longitudinal sectional view of the meter showing the transmission gearing locking devices in "unlocked" position.
Figure 5:
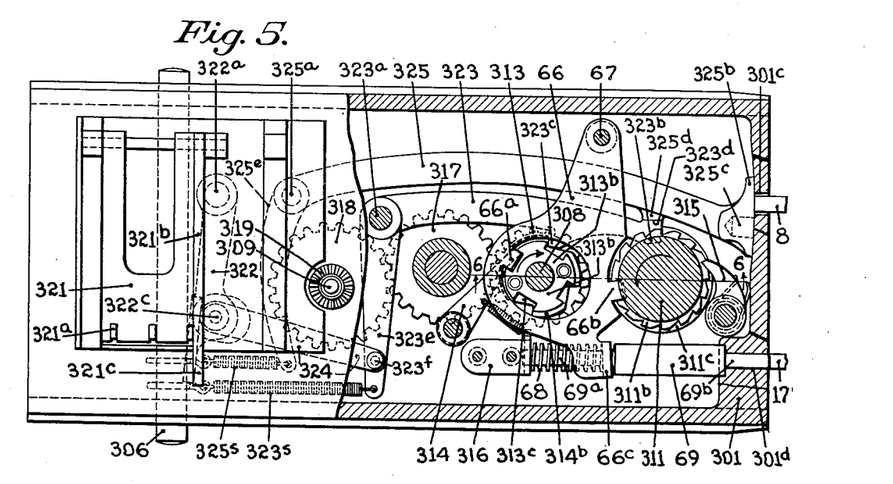
Fig. 5 is a view similar to Fig. 4, showing the parts in "locked" position.

The direction of revolution of the actuating member 311 and the shaft 308 is indicated by the arrows in Fig. 5, and suitable means should be provided to prevent either from being revolved in the opposite direction. As shown in Fig. 4, a pawl 314 is pressed against the cam 313ᵇ by a suitable spring and is adapted to engage the slots 313ᶜ in cam 313ᵇ, and while permitting revolution of cam 313ᵇ in the direction of the arrow, pawl 314 will prevent its revolution in the contrary direction. Likewise a pawl 315 is pressed by a suitable spring against the teeth of the ratchet 311ᵇ and will prevent the revolution of the actuating member 311 in a direction contrary to that shown by the arrow in Fig. 5.

In order to prevent any accidental turning of either actuating member or the shaft 308 when the meter is removed from the postage meter machine, and also to insure the correct alignment of the tongue 311ᶻ with the clutch member of the machine when the meter is placed in position on the machine, a catch 66 is employed, see Figs. 3, 4 and 5. This catch is made of sheet metal, and is pivoted at one end as at 67 in the base, and extended past the actuating member 311 and is provided with an elongated hole for the acommodation of the cam 313ᵇ (see Figs. 4 and 5) and said catch 66 is provided with a lug 66ª which is adapted to engage any one of four notches 313ᶜ in the edge of the cam 313ᵇ. The catch 66 also has a lug 66ᵇ adapted to engage a notch or slot in the ratchet 311ᵇ of the actuating member 311. The free end of the catch 66 is also provided with a depending lug 66ᶜ which is perforated for the passage of the reduced end 69ª of a pin 69 which is reduced in diameter at each end, but has a central portion of greater diameter.

The right hand end 69ᵇ (Figs. 4 and 5) of this pin 69 passes through a hole 301ᵈ in the end wall of the base 301, the outward movement of the pin being limited by the thicker portion of said pin abutting against the inside wall of base 301, so that the outer extremity of the pin 69ᵇ will be flush with the outside wall of the base 301. The inner end portion 69ª of pin 69 is supported in a stud 316 secured to the base 301. A spring 68 is strung on part 69ª of the pin and presses against the stud 316, and tends at all times to force the pin 69 outward, and also to swing the latch 66 to the right so that its lug 66ª will engage one of the notches 313ᶜ in the cam 313ᵇ, and its lug 66ᵇ will engage the slot in the ratchet 311ᵇ. This will be the position of the latch 66, at all times, when the meter is removed from the postage meter machine.

In the postage meter machine, as explained in my aforesaid patent, there is a reciprocable pin 17 (Figs. 4 and 5) which is adapted to enter the hole 301ᵈ in the inner end of the meter base when the latter is operatively positioned on the machine, with hole 301ᵈ registering with the pin 17, as described in the said patent. When my improved meter is placed in said machine this pin 17 will enter the hole 301ᵈ and push the pin 69 inward, thereby swinging the locking plate 66 to the left against the action of the spring 68 and thereby disengaging the lugs 66ª and 66ᵇ from the cam 313ᵇ and ratchet 311ᵇ, thus releasing them. Fig. 4 shows the catch 66 in the position which it occupies when the meter is in place in the postage meter machine described in my said patent, and Fig. 5 shows the catch 66 in position assumed by it when the meter is removed from the machine.

The registering mechanism.

Mounted on top of the base 301 (Fig. 3) to the left of bracket 301ª, is the recording mechanism which includes two counters T and B (Fig. 2) mounted together in one frame 307, Fig. 3, and enclosed in a metal case 300. The case 300 has a hinged door 300ª, Fig. 2 secured by lock and seal, and it has in its top two glazed openings 300ᵇ and 300ᶜ, Fig. 1, marked "Total" and "Balance" through which may be read the numeral wheels of the two counters T and B before mentioned.

A train of gears contained partly within the case 300 and partly in the hollow bottom of the base 301 connects the vertical drive shaft 308 with the two counters, so that any movement or revolution given to the shaft 308 will be communicated directly to said counters.

The gearing between shaft 308 and the counters is such that for every one-fourth turn of shaft 308 one cent will be added to the "total" and one cent will be subtracted from the "balance" counter, so that if the 1¢ die is in place in the meter, each full revolution of the die 312 will record 1¢ on the counter, and if the 10¢ die is in place, 10¢ will be recorded, and so on for each of the various denominations.

As shown in Figs. 3, 4, and 5, the gear connection between shaft 308 and the counter shaft comprises a gear 313 on shaft 308 meshing with an intermediate gear 317 which drives a gear 318 on the lower end of a vertical shaft 309, which extends into the case 300 and has a bevel pinion 319 on its upper end meshing with a bevel gear 320 on a short horizontal shaft 310 on which is a gear pinion 310ª which meshes with the pinion 60ª of both counters T and B.

The counters T and B may be of any suitable construction, but are preferably of the rotary numeral wheel type, and adapted to operate as shown and described in my companion applications (case #6794), filed Dec. 12, 1922, Ser. No. 606,427; and (case #6754) filed July 12, 1922, Ser. No. 574,427, and need no particular description herein.

Each counter is preferably of the "geared" type, that is, the motion of one of its numeral wheels is communicated to the next numeral wheel of higher denomination by means of intermittently operated gears. In each counter (Fig. 3) the unit wheel 50 is the prime mover of the series. None of the wheels can be turned independently, but each is moved in regular order of progression by means of its gear connection with the unit wheel. As shown in Fig. 3, a series of such numeral wheels 50, 51, 52, 53, 54 are mounted on a spindle 60, supported in the ends of the frame 307. The wheel 50 is the unit wheel of the series, and is fast to the spindle 60 to which the pinion 60ª is secured, consequently any motion of the shaft 308 will be communicated to the "unit" wheels 50 of both counters T and B, and therefrom, to the other numeral wheels in order.

In the example shown, each counter has five numeral wheels 50, 51, 52, 53, 54. Wheel 50 being the "units" or "cents" wheel; 51 the "tens" wheel; 52 the "hundreds" or "dollar" wheel; 53 the "tens of dollars" wheel; and 54 the "hundreds of dollars" wheel.

Suitable mechanical means are provided whereby when the "units" wheel 50 has made one revolution the "tens" wheel 51 will be moved one point, and so on down through the series, each wheel of lower denomination actuating a wheel of higher denomination one point. The "units" and "tens" wheels 50 and 51 indicate the value in cents; and the wheels 52, 53, and 54 indicate the values in dollars.

Thus, the numeral wheels will be properly operated in sequence as is required in any consecutive numbering or registering device, and means are provided as in my said patent and application for locking the registering mechanism against further operation when the balance counter has completed its full count, as will be hereinafter explained. The numeral wheels and their carry over devices above described are of well known construction and do not require more detailed explanation or illustration. Further, while I prefer to use the said construction of registering wheels and carry over devices the invention is not limited thereto, and any other suitable kind of registering wheels and carry over devices could be used.

In the totaling counter T the wheels carry over or add; that is, display an increased number for each operation of the die. The balance counter B is preferably a subtracting counter, and shows a decreased number for each operation of the die.

When the subtracting counter is used, the wheels should be set to start at zero (000) which in reality is 1000 as the next number in the series is 999 and when so set it will subtract consecutively a unit at a time, till 001 is reached: then the next count (decrease of 1) will bring all the wheels back to zero again (000) which is actual zero this time as 1000 has been subtracted from the original count. I have therefore provided means for automatically locking the meter at this point; and when so locked the numeral wheels cannot be shifted until the locking mechanism has been "reset" by hand. The object of this "locking" and "resetting" is fully explained in my aforesaid patent and application.

The particular meter illustrated in the drawings submitted is designed for use on a machine which can print postage stamps of six different denominations, consequently the registering mechanism or counter in this meter should be made to lock when the 3 numeral wheels (52, 53, 54) indicating "dollars" come to their zero (0) positions disregarding the positions of the two wheels 50, 51, which indicate "cents".

As stated, the particular operation and construction of the registering mechanism, per se, forms no part of the present invention, but it is preferably operated and constructed substantially as described in my aforesaid application on postage meters (case #6754) Serial No. 574,427, filed July 12, 1922.

In the hollow base 301 are arranged the locking levers, hereinafter described. Figs. 4 and 5 show the arrangement of these levers; the counters and all the trip mechanism of the meter being omitted in these figures in order to give a clearer view of the working of the locking levers. Fig. 4 shows the parts in the positions they occupy when the meter is "charged", and in place on the postage meter machine; while Fig. 5 shows the parts in the position assumed when the meter has been "discharged" and removed from the machine.

A locking comb or plate 321, substantially as described in my said application and patent, is pivoted to lugs on the floor of the counter frame 307, and its upwardly projecting teeth 321ª are adapted to engage notches in the locking disks attached to the "dollar" numeral wheels of the "balance" counter B when such numeral wheels show "zero", at the sight opening 300° in the casing 300, plate 321 being normally pressed upwardly by springs 321ˢ.

Secured to the side of the locking plate 321 is a plate 321ᵇ having an outwardly projecting lug 321ᶜ which acts as a handle used in moving the locking comb 321 in charging the meter. Plate 321ᵇ also has a downwardly projecting lug 321ᵈ which depends through the floor of the counter frame 307 into the space between the floor of 307 and the base 301, and when the comb 321 is in its "down" position (Fig. 3) obstructs the movement of the lever 322 (Figs. 3, 4, 5).

Lever 322 is pivoted at 322ª in the space between the counter frame 307 and base 301 and has a downwardly projecting lug 322ᵇ (Fig. 3) which passes through an opening in the top of base 301 into the base wherein it is connected by a link 324 and pins 322ᶜ and 323ᶠ to one arm 323ᵉ of a bell crank lever, pivoted in the base 301 at 323ª, and the long arm 323 of this lever extends toward the actuating member 311, and arm 323 has a lug 323ᵇ on its free end directly opposite a slot 311ᶠ, Fig. 4, cut into the cam 311ᶜ of the actuating member 311. Arm 323 also has a lug 323ᶜ opposite and adapted to engage the teeth of the ratchet 313ª on shaft 308. The function of this lever 323 is to lock the actuating member 311 and the shaft 308 when the meter is discharged by having its lugs 323ᵇ and 323ᶜ respectively engaged with the slot 311ᶠ of carrier 311, and one of the teeth of the ratchet 313ª of shaft 308. The function of this lever 323 is to lock the actuating member 311 and the shaft 308 when the meter is discharged by having its lugs 323ᵇ and 323ᶜ respectively engaged with the slot 311ᶠ of carrier 311, and one of the teeth of the ratchet 313ª of shaft 308. A spring 323ˢ causes 323 to assume the position shown in Fig. 5, and cause the lugs 323ᵇ and 323ᶜ to engage and lock both the actuating member 311 and shaft 308.

When the meter is "charged" however the locking plate 321 is in the down position and the lug 321ᵈ holds lever 322 in the position shown in Figs. 3 and 4, and the connecting link 324 holds the lever arm 323 clear of engagement with the cam 311ᶜ and ratchet 313ª, so that both shaft 308 and the actuating member 311 can be rotated.

As explained in my aforesaid patent, the proper functioning of the clutch which drives the coupling member which engages the tongue on the printer driving spindle in the meter is controlled by mechanism which reciprocates what is termed in that case the "meter pin" 8, this meter pin being reciprocated so that it has to project through the meter casing at the beginning of a printing operation. If by any means this entrance of the meter pin is prevented, the clutch will not operate, consequently the die will not revolve, and the mail matter will be forwarded through without receiving any imprint.

In the present case, the specific meter shown herein is adapted to be used in place of the meter in my said patent, and the tongue 311ᶻ on the actuating member 311 will engage the clutch driven member just the same as the tongue on the die spindle in the meter in said patent would engage said member and as this meter is designed for use on the said patented postage meter machine a hole 301ᵉ, Figs. 4 and 5, is drilled in the end wall of the base 301 to admit the meter pin 8, which meter pin is constructed and operated as described in said patent. A lever 325 is also provided in the meter base to open or close the hole 301ᶜ at proper times to permit or prevent the entrance of the aforesaid meter pin 8, as described in said patent.

As shown, the lever 325 is pivoted at 325ᵃ within the base 301, and its longer arm extends toward the hole 301ᶜ and is provided with a head 325ᵇ having its outer face curved on an arc with pivot 325ᵃ as its center. A hole or socket 325ᶜ is drilled in this head 325ᵇ and is adapted to register with hole 301ᶜ as shown in Fig. 4 when the lever 325 is in normal position. A spring 325ˢ is attached to the sheet arm 325ᵉ of lever 325 and continually urges lever 325 to press against lever 323; lever 323 has a boss 323ᵈ adapted to engage a boss 325ᵈ on lever 325.

The contact of boss 323ᵈ with boss 325ᵈ constitutes the only obstruction to the free movement of lever 325; and thus the lever 323 controls the position of lever 325.

When the meter is "charged" the levers 323 and 325 are positioned as in Fig. 4, and the socket 325ᶜ is in line with the hole 301ᶜ, and the meter pin 8 can project through the hole 301ᶜ into the socket 325ᶜ; but when the levers 323, 325, are shifted to the positions shown in Fig. 5, the socket 325ᶜ and the meter pin 8 cannot enter said hole and will be stopped by coming in contact with the machined face of the head 325ᵇ of lever 325, and this stoppage of the meter pin will prevent the clutch from revolving the actuating member and therefore no more imprints can be taken from the die, as explained in my said patent.

When the meter is "discharged" by reason of the amount of prepaid postage being used up (or in other words when all of the "dollar" numeral wheels of the balance counter B read zero), the teeth 321ᵃ of the locking comb 321 enter the notches of the disks attached to the numeral wheels of the counter, and the locking comb is raised by its springs 321ˢ, withdrawing the lug 321ᵈ from contact with lever 322.

As soon as lug 321ᵈ releases lever 322, the spring 323ˢ rocks arm 325ᵉ of lever 323 and through link 324 pushes lever 322 to the left, and the end 323ᵇ of arm 323 will be brought into contact with the cam 311ᶜ of the actuating member 311 and will engage the slot 311ᶠ of the cam 311ᶜ at the end of the printing operation when the actuating member 311 is brought to its normal position of rest. Meanwhile the ratchet 313ᵃ is allowed to revolve (as the lug 323ᶜ is held clear of engagement with the teeth of the ratchet 313ᵃ by the boss 323ᵇ bearing on the cylindrical face of cam 311ᵉ) until the boss 323ᵇ of lever 323 drops into the slot 311ᶠ of cam 311ᶜ. The actual locking therefore does not take place till the end of the operation, although the levers may be released at any time during the operation.

The said movement of lever 323 permits the lever 325 to swing under the action of its spring 325ˢ, and close the hole 301ᶜ, thus preventing the re-entry of the meter pin 8 into socket 325ᶜ.

The lever 325, being governed by lever 323, might be made a part of it; but as there is a possibility of some foreign matter entering the hole 301ᶜ and becoming wedged between the wall of base 301 and the head 325ᵇ preventing its free action, I prefer to employ separate members to close the hole 301ᶜ and to positively lock the meter, simply as an added precaution for safety. If the lever 325 and the lever 323 were in one piece, and any foreign matter jammed the action of the head 325ᵇ, then the locking of the carrier 311 and shaft 308 might not take place, and undue strain would be thrown on the more delicate mechanisms of the register. But by having the levers 323 and 325 separate, as shown, jamming of the lever 325 would have no effect on the locking lever 323, and though in such case the meter pin 8 might again enter socket 325ᶜ thereby permitting engagement of the clutch, it would be impossible to revolve the carrier 311, as the lever 323 would have engaged and locked same.

Pawl 314, engaging the slots in cam 313ᵇ, prevents any retrograde movement of shaft 308 or the counters at any time. It is inaccessibly placed within the sealed enclosure where it cannot be tampered with and is always on duty.

The catch 66 also engaging the slots in cam 313ᵇ prevents shaft 308 from being manually turned when the meter is removed from the machine. This catch is introduced for two reasons, first, to guard against accidental turning of shaft 308 in a forward direction when the dies are being changed or cleaned, and second, to insure the correct location of the shaft 308 on either one of the four quarters necessary to correctly mesh the gears.

The catch 66 being accessible from the outside by means of the pin 69ᵇ can be tampered with and therefore it is possible to turn shaft 308 in a forward direction only, by manipulating this pin 69ᵇ and releasing the catch 66. But a forward motion (that is a motion in the direction of the arrow, Fig. 5) of shaft 308 will only tend to discharge the meter, in other words the registers will record 1¢ for each ¼ turn given shaft 308 in this direction and the user will be out of pocket that amount. A backward motion of shaft 308 being impossible by reason of pawl 314, the counters cannot be made to undo their record, and the Post Office Department is therefore safeguarded.

Also when the meter is discharged the lock 323 effectually prevents any movement whatever of shaft 308.

The fact of the die being in or out of position does not affect the case.

Operation.

As stated, the meter is particularly adapted to be attached to a machine of the type shown in my Patents #1,277,793, and #1,370,688, or other machines of like general character.

When the meter is used in connection with such a machine, the meter is supposed to be detached and the die removed therefrom. Then the meter is taken to the Post Office Department, and the owner purchases say one thousand dollars worth of postage, and the post office official will set the subtracting counter B to show the full amount of $1000 at the sight opening, as described in my application Ser. No. 574,427 (case 6754). The post office official then seals the meter and when so set the meter can be replaced in the machine and the latter operated, as desired, until practically the full amount of postage paid for has been used by printing stamps to that amount by successive operations of the machine to which the meter is attached. The subtracting counter cannot be operated unless the meter is in place on the machine, as when removed therefrom the meter is automatically locked as explained. When the meter is in place on the machine, the unit wheel of the subtracting counter B will be operated for each operation of the machine to accord with the denomination of the die used with the meter. It is obvious that, if it is desired to have the meter set for a larger amount of postage, more numeral wheels would have to be used in the subtracting counter. If it is desired to have a less amount of postage sold for each setting less numeral wheels could be employed in the subtracting counter. This capacity is governed by the number of figure wheels in the counter, each additional wheel, after the first, increasing the capacity ten times; for instance, 5 wheels would have a maximum capacity of $999.99 but by utilizing the five ciphers as they come into position the real capacity of the counter is equivalent to $1000.00—the figure 1 not appearing. To provide for this contingency the figure 1 may be engraved on the hub of the last numeral wheel of the counter, as more fully explained in my application (case #6574) Ser. No. 574,427.

The totaling counter T operates in ascending series only, and its function is simply to register the total amount which has been printed by the machine up to the maximum capacity of such counter.

Operation of "charging" or setting the meter.

The meter is originally set at zero; the numeral wheels all showing "0" at the "total" sight opening, and "000.00" at the subtracting counter ("dollars and cents") sight opening. The teeth of the locking plate will then be fully engaged with the notched disk of the numeral wheels 54, 53, 52, and the hole 301$^c$ in the end wall of the meter will be closed by the shutter lever head 325$^b$, and the catch 66 engaged with one of the slots 313$^c$ of disk 313$^b$ and the slot in the actuating member 311; in other words, the meter and counters will be effectually locked against operation.

Upon opening the door of the case 300 the levers 322 and plate 321$^c$ are accessible. The lever 322 is then moved to the right causing link 324 to push the lever arm 323 out of engagement with the notches in cam 313$^b$ and the actuating member arm 323 moving the arm 325 and head 325$^b$ to the position where socket 325$^c$ registers with the hole 301$^c$ in the wall of the meter. Next, the locking member 321 is moved downward by handle 321$^c$ disengaging the teeth from slots in the disks of the numeral wheels, and this downward movement of the locking plate brings its lug 321$^d$ into the path of lever 322 and prevents such lever being returned to normal position by spring 323$^s$.

The subtracting counter numeral wheels will now show 1000.00 at the sight opening (see Fig. 1). This figure "1" appearing at the sight opening (see Fig. 1) is proof that the meter has been properly "set"; it also shows that $1000 in postage has been paid for and can be used.

The automatic locking of the meter.

When the meter is operated, if the first die used prints a one-cent stamp, the first impression will subtract 1 from the $1000.00 shown on the dial in the balance counter B. This means that all five figure wheels will be moved one-tenth revolution and will read 999.99, and the flange 54$^e$ being connected with the numeral wheel 54, will also revolve one-tenth revolution, moving the figure 1 engraved upon it out of sight on the dial as explained in my patent. The unit wheel of the "total" register T will also be moved one-tenth revolution hiding the 0 and bringing the "1" into view at the sight opening. The reading at the sight opening of the total register will then be "01" and at the sight opening of the subtracting counter will be 999.99.

When the numeral wheel 52 of the subtracting counter B has been turned until the related tooth 321$^a$ of the locking plate enters the slot in the disk, the next tooth of the locking member will rest on the periphery of the disk of numeral wheel 53 and which will be when the subtracting counter shows 099.99.

The last tooth of this locking plate will now rest on the disk, and when such tooth enters the slot therein (which will happen when the dial reads 000.99 or less) all obstructions will be removed and the locking plate 321 will rise to its limit, drawing up the lug 321ᵈ and releasing the lever 322.

When the lug 321ᵈ is drawn up out of the way, springs 323ˢ and 325ˢ would oscillate the levers 325 and 323 on their pivots, but are prevented from immediately so doing by reason of the meter pin 8 being at the moment entered in the socket 325ᶜ in the head 325ᵇ of shutter lever arm 325, said pin, as explained in said patent, being only withdrawn from the meter at the completion of the then occurring printing operation of the machine to which the meter is attached. But as soon as the pin 8 is withdrawn the levers 323 and 325 are moved by the springs throwing the socket out of register with the hole in the end wall of the meter, so that pin 8 cannot again reenter it, and lever 323 locks the actuating member 311 and the shaft 308 as above described. The hole 301ᶜ being closed, the meter pin 8 cannot enter again; and until it can again enter, the related printing mechanism (or other operative mechanism) to which the meter is applied, is also rendered ineffective until the meter is removed, reset, and replaced therein.

When the meter is removed from the machine the pin 69 is projected outwardly by the spring 68 and the latch lever 66 is shifted to position shown in Fig. 5, locking both the actuating member 311 and the shaft 308 against any further rotatorial movement until the meter is again operatively positioned in the machine substantially as described in my aforesaid patent. Thus, it will be seen that when the meter is properly set and placed in the machine it is free to operate with any die which may be placed therein, and until a die is placed in the meter no printing impressions can be made therefrom, and the shaft 308 will not be turned unless and until the die is properly positioned on the meter.

While I have described the invention as applied to a removable meter, the features of the removable interchangeable die and selective gearing might be embodied in a machine in which the registering mechanism is an inseparable part of the machine; or if used for other purposes than a postage meter, as for example to print and register amounts or values only, the dies only need be removable. The adaptability and utility of the invention for many purposes in the art, other than merely printing postage will be obvious to those familiar with the invention, and I consider all such applications within the scope of the invention as covered in the claims:

What I claim is:

1. In mechanism of the character specified, a register, means for removably supporting a die in operative position relative to the register a removable rotatable interchangeable die, means for actuating the die when in place, and means whereby when said die is operated the register will be operated in accordance with the denomination of such die.

2. In combination with mechanism of the character specified, an actuating member, a register, means for supporting a removable die in operative relation to the actuating member and register a removable rotatable interchangeable die adapted to be operatively connected with the actuating member when placed in operative position, and means whereby when said die is operatively connected with the actuating member the register will be operated in accordance with the denomination of such die.

3. In mechanism of the character specified, an actuating member, a register, a shaft, gearing for driving the register from said shaft, a removable interchangeable die adapted to be operatively connected with the actuating member, and means whereby when said die is operatively connected with the actuating member it transmits motion to said shaft, whereby the register will be operated in accordance with the denomination of such die.

4. In mechanism of the character specified, a register, a register actuating shaft, gearing between the actuating shaft and the register, an actuating member, a removable interchangeable die adapted to be connected with the actuating member, and means whereby when the die is operatively positioned in the machine motion is transmitted from the die to said shaft, whereby the registering mechanism is actuated in accordance with the denomination of the die.

5. In mechanism of the character specified, a register, a register actuating shaft, gearing between the actuating shaft and the register, an actuating member, a removable interchangeable die adapted to be connected with the actuating member, and selective gearing between the die and said shaft when the die is operatively positioned in the machine, whereby the registering mechanism is actuated in accordance with the denomination of the die.

6. In mechanism of the character specified, a register, a register actuating shaft, gearing between the actuating shaft and the register; an actuating member, a removable interchangeable die adapted to be connected with the actuating member, a conical set of gears on said shaft, and a gear on the die adapted to engage a related one of the conical set of gears when the die is in position on the machine, whereby a predetermined extent of angular movement is imparted to the said shaft for each rotation of the die to cause the register to register an amount corresponding to the numerical value of such die.

7. In a meter of the character and for the purpose specified, a register, a register actuating shaft, gearing between the actuating shaft and the register, an actuating member, a removable interchangeable die adapted to be driven by the actuating member, means for detachably holding the die in operative position on the meter, a conical set of selective gears on said shaft, and a gear on the die adapted to engage the related one of the gears in the set of cone gears on the shaft when the die is in operative position on the machine, whereby a predetermined extent of angular movement is imparted to the said shaft for each rotation of the die to cause the register to register an amount corresponding to the numerical value of such die.

8. In mechanism of the character specified a casing, a shaft mounted in said casing, means for preventing backward rotation of said shaft, a register, means for operating the register from said shaft, a plate for locking the register when the numeral wheels thereof register "0"; a locking lever adapted to lock the shaft, and means controlled by said locking plate for holding said locking lever out of operative position until said locking plate locks the register, substantially as described.

9. In mechanism of the character specified a casing, an actuating member rotatably journaled therein, means for preventing backward rotation of said actuating member, a register, means for indirectly operating the register from said actuating member shaft, a plate for locking the register when the numeral wheels thereof register "0"; a locking lever adapted to lock the actuating member, and means controlled by said locking plate for holding said locking lever out of operative position until said locking plate locks the register, substantially as described.

10. In mechanism as set forth in claim 9, said casing having an opening for the entrance of a meter pin, and a head adapted to free or close said opening, and normally held in position to free the opening when the said locking lever is disengaged from the actuating member.

11. In combination with mechanism as set forth in claim 9, said casing having an opening for the entrance of a meter pin, a head adapted to free or close said opening, and normally held in position to free the opening when the said locking lever is disengaged from the actuating member; a locking plate adapted to lock the actuating member when the meter is removed from the machine, spring means for moving the plate to locking position, and means whereby said plate is held out of locking position when the mechanism is in position in the machine.

12. In mechanism of the character specified a casing, an actuating member rotatably journaled therein, a shaft mounted in said casing parallel with the actuating member, means for preventing backward rotation of said shaft and said actuating member, a register, means for operating the register from said shaft, a plate for locking the register when the numeral wheels thereof register "0"; a locking lever adapted to engage the actuating member and the shaft to lock the same against rotation, and means controlled by said locking plate for holding said locking lever out of operative position until said locking plate locks the register, substantially as described.

13. In mechanism as set forth in claim 11, said casing having an opening for the entrance of a meter pin, and a head adapted to free or close said opening, and normally held in position to free the opening when the said locking lever is disengaged from the shaft and actuating member.

14. In combination with mechanism as set forth in claim 11, a locking plate adapted to lock both the shaft and the actuating member when the meter is removed from the machine, spring means for moving the plate to locking position, and means whereby said plate is held out of locking position when the mechanism is in position in the machine.

15. In combination with mechanism as set forth in claim 11, said casing having an opening for the entrance of a meter pin, a head adapted to free or close said opening, and normally held in position to free the opening when the said locking lever is disengaged from the shaft and actuating member; a locking plate adapted to lock both the shaft and the actuating member when the meter is removed from the machine, spring means for moving the plate to locking position, and means whereby said plate is held out of locking position when the mechanism is in position in the machine.

16. In mechanism of the character specified, a register, a shaft, gearing between the shaft and register, an actuating member, a removable die adapted to be detachably but non-rotatably engaged with the actuating member and having a journal and a bearing for the said journal adapted to permit placing the die in or removing it from operative position.

17. In combination with mechanism as set forth in claim 16, means whereby said shaft is driven from the actuating member through the die when the latter is in position.

18. In combination with mechanism as set forth in claim 16, selective gears on the shaft, and a gear on the die adapted to engage one of the gears on the shaft whereby said shaft is driven through the die when the latter is positioned on the machine.

19. In mechanism of the character specified, a register, a shaft, gearing between the shaft and the register, an actuating member, a removable interchangeable die having one end adapted to be detachably but non-rotatably engaged with the actuating member and having a journal on its other end, a bearing for the journal of the die, said bearing being adjustable to permit the placing or removal of the die, and means whereby said shaft is driven from the actuating member through the die when the latter is in position on the machine.

20. In mechanism of the character specified, a register, a shaft, gearing between the shaft and the register, an actuating member adapted to be driven when the mechanism is in operative position, a removable die having a spindle one end of which is adapted to be detachably but non-rotatably engaged with the actuating member, and its other end having a journal, and a bearing for the journal of the spindle adapted to permit the placing or removal of the die.

21. In combination with mechanism as set forth in claim 20, gearing whereby said shaft is driven from the die when the latter is in operative position.

22. In a meter of the character specified, an actuating member, a removable interchangeable die having a pin and socket engagement with the actuating member when the die is in position in the machine, and means for holding the die in operative position.

23. In a meter of the character specified, an actuating member, a removable interchangeable die having a pin and socket engagement with the actuating member when the die is in position in the machine and provided with a journal on its upper end, a bearing for the journal of the die, and means for holding the die in operative position.

24. In a meter of the character specified, an actuating member, a removable interchangeable die engaged with the actuating member when the die is in position in the machine to cause the die to rotate with the actuating member, said die having a spindle, an adjustable plate adapted to engage the spindle of the die, and a catch for holding the plate to retain the die in position.

25. In a meter of the character specified, an actuating member, a removable interchangeable die having a pin and socket engagement with the actuating member when the die is in position in the machine to cause the die to rotate with the actuating member, said die having a spindle provided with a journal on its upper end, an adjustable plate having a bearing adapted to engage the journal of the die to hold same in position on the machine, and a catch for holding the plate to retain the die in position.

26. In a meter of the character specified, an actuating member, a removable interchangeable die engaged with the actuating member when the die is in position in the machine to cause the die to rotate with the actuating member, said die having a journal, a fixed member for positioning the die, and an adjustable bearing adapted to engage the journal of the die to hold same in position on the machine, and means for holding the bearing to retain the die in position.

27. In a meter of the character specified, an actuating member, a removable interchangeable die engaged with the actuating member when the die is in position in the machine to cause the die to rotate with the actuating member, said die having a spindle provided with a journal on its upper end, a fixed half-bearing adapted to engage the die spindle to position the die, an adjustable bearing adapted to engage the journal of the die to hold same in position on the machine, and means for holding the bearing to retain the die in position.

28. In a meter of the character specified, an actuating member, a register, a shaft beside the actuating member, gearing for operating the register from said shaft, a removable interchangeable die having a pin and socket engagement with the actuating member to cause the die, when in position, to rotate with the actuating member, said die having a journal on its upper end, an adjustable plate having a bearing adapted to engage the journal of the die to hold same in position on the machine, and a spring catch for holding the plate in position to retain the die in place.

29. In combination with mechanism as set forth in claim 28, means whereby said shaft is driven through the die when the latter is positioned on the machine.

30. In combination with mechanism as set forth in claim 28, selective gears on the shaft, and a gear on the die adapted to engage one of the gears on the shaft whereby said shaft is driven through the die when the latter is positioned on the machine.

31. In mechanism of the character specified a casing having an opening for the entrance of a meter pin, a shaft mounted in said casing, means for preventing backward rotation of said shaft, a register, means for operating the register from said shaft, a plate for locking the register when the numeral wheels thereof register "0"; a locking lever adapted to lock the shaft, means controlled by said locking plate for holding said locking lever out of operative position until said locking plate locks the register; a lever adapted to free or close said opening and normally held in position to free the opening when said locking lever is disengaged from the shaft, a locking plate adapted to lock the shaft when the meter is removed from the machine, spring means for moving the plate to locking position, and means whereby said plate is held out of locking position when the mechanism is in position in the machine.

32. In mechanism of the character specified, a casing having an opening for the entrance of a meter pin; a shaft mounted in said casing; a register, gearing for operating the register from said shaft; a plate for locking the register; a lever adapted to free or close said meter pin opening; a locking lever adapted to unlock the gearing in one position and permit said first mentioned lever to uncover the meter pin opening and in another position to lock the gearing and permit said first lever to close the meter pin opening; spring means for moving said levers in one direction, and means controlled by said plate whereby the locking lever is held out of shaft engaging position and the first lever is held in position to uncover the opening until the plate locks the register.

33. In combination with mechanism as set forth in claim 32, said locking lever also having a lug, and a ratchet on one of the train of gears adapted to be engaged by the said lug when the locking lever locks the gears, whereby an additional locking of the train of gears is effected.

In testimony that I claim the foregoing as my own I affix my signature.

ARTHUR H. PITNEY.